(No Model.)  4 Sheets—Sheet 1.

E. P. PEACOCK.
MACHINE FOR BARBING WIRE.

No. 287,714.  Patented Oct. 30, 1883.

WITNESSES
Wm A. Skinkle
Edwin A. Newman

INVENTOR
Elijah P. Peacock
By his Attorney Wm Zimmerman (No Model.)

4 Sheets—Sheet 3.

E. P. PEACOCK.
MACHINE FOR BARBING WIRE.

No. 287,714.  Patented Oct. 30, 1883.

WITNESSES
Wm A. Skinkle
Edwin A. Newman

INVENTOR
Elijah P. Peacock
By his Attorney Wm Zimmerman (No Model.)

E. P. PEACOCK.

MACHINE FOR BARBING WIRE.

No. 287,714. Patented Oct. 30, 1883.

WITNESSES
Wm A. Skinkle
Edwin A. Neuman

INVENTOR
Elijah P. Peacock
By his Attorney Wm Zimmerman

UNITED STATES PATENT OFFICE.

ELIJAH P. PEACOCK, OF CHICAGO, ILLINOIS.

MACHINE FOR BARBING WIRE.

SPECIFICATION forming part of Letters Patent No. 287,714, dated October 30, 1883.

Application filed March 21, 1883. (No model.)

*To all whom it may concern:*

Be it known that I, ELIJAH P. PEACOCK, of Chicago, in the county of Cook and State of Illinois, have invented certain new and useful Improvements in Machines for Barbing Fence-Wire; and I hereby declare the following to be a full, clear, and exact description thereof, which will enable others skilled in the art to which my invention relates to make and use the same, reference being had to the accompanying drawings, forming a part hereof, in which—

Figure 1:
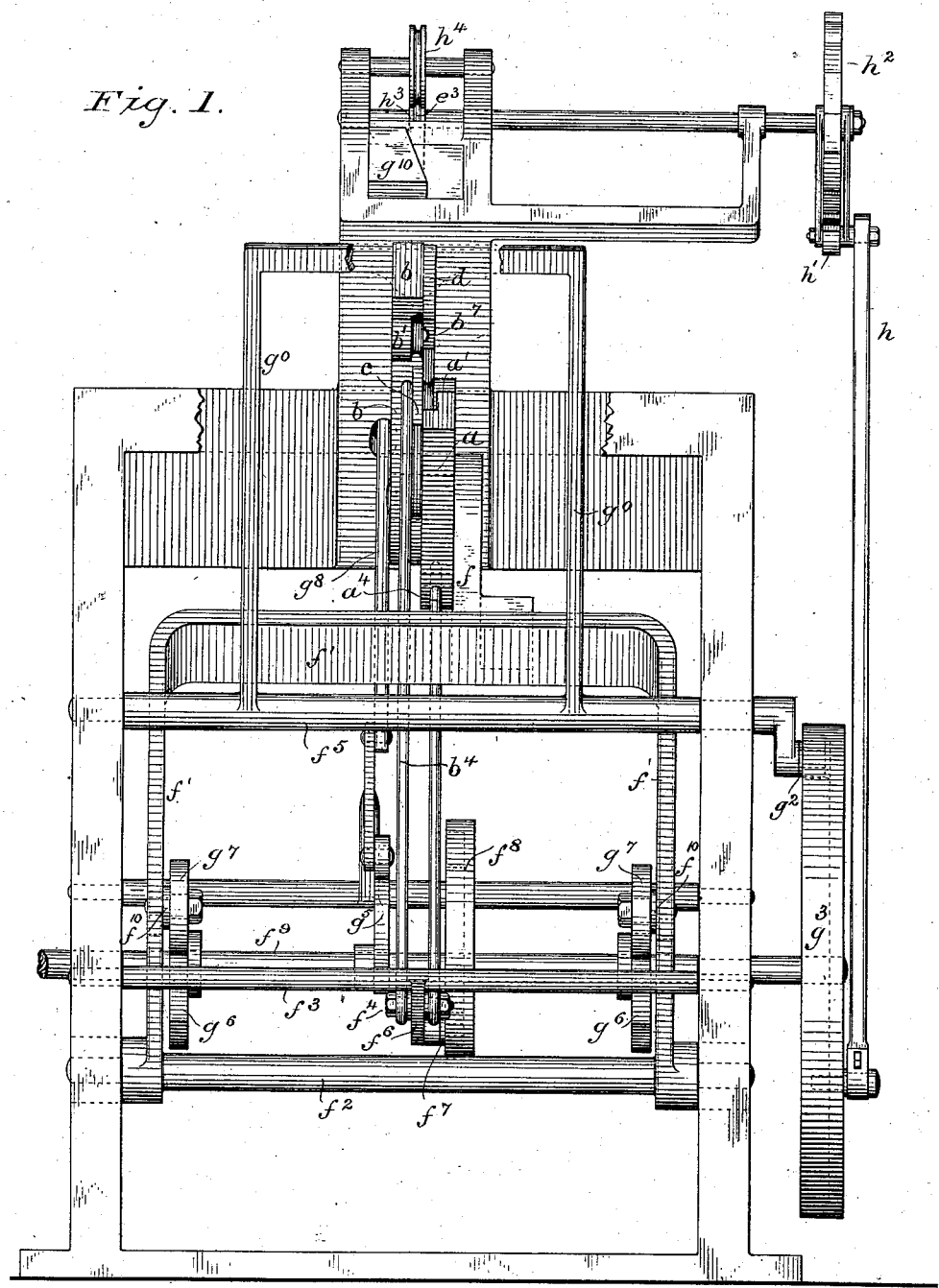
Figure 2:
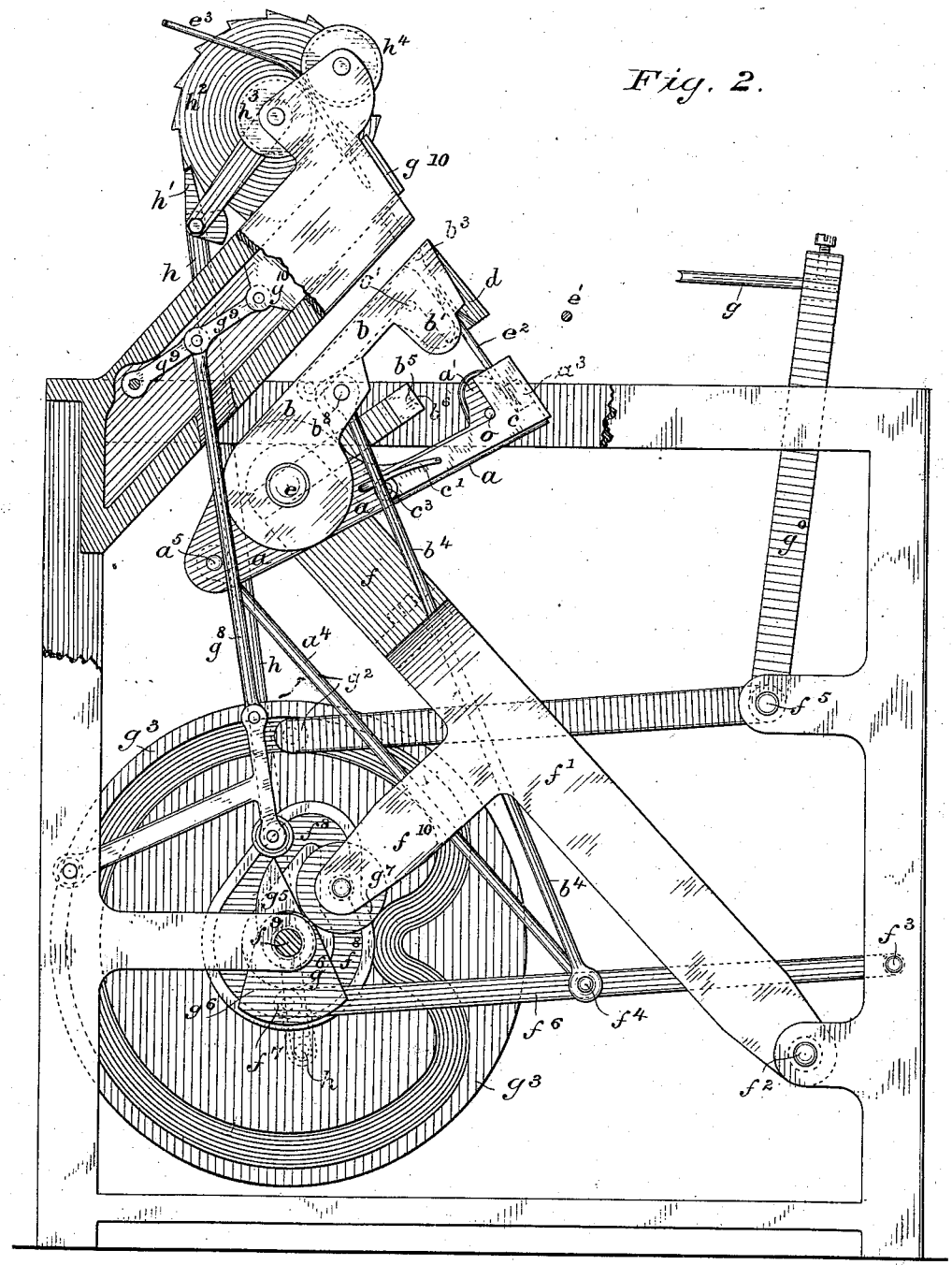
Figure 3:
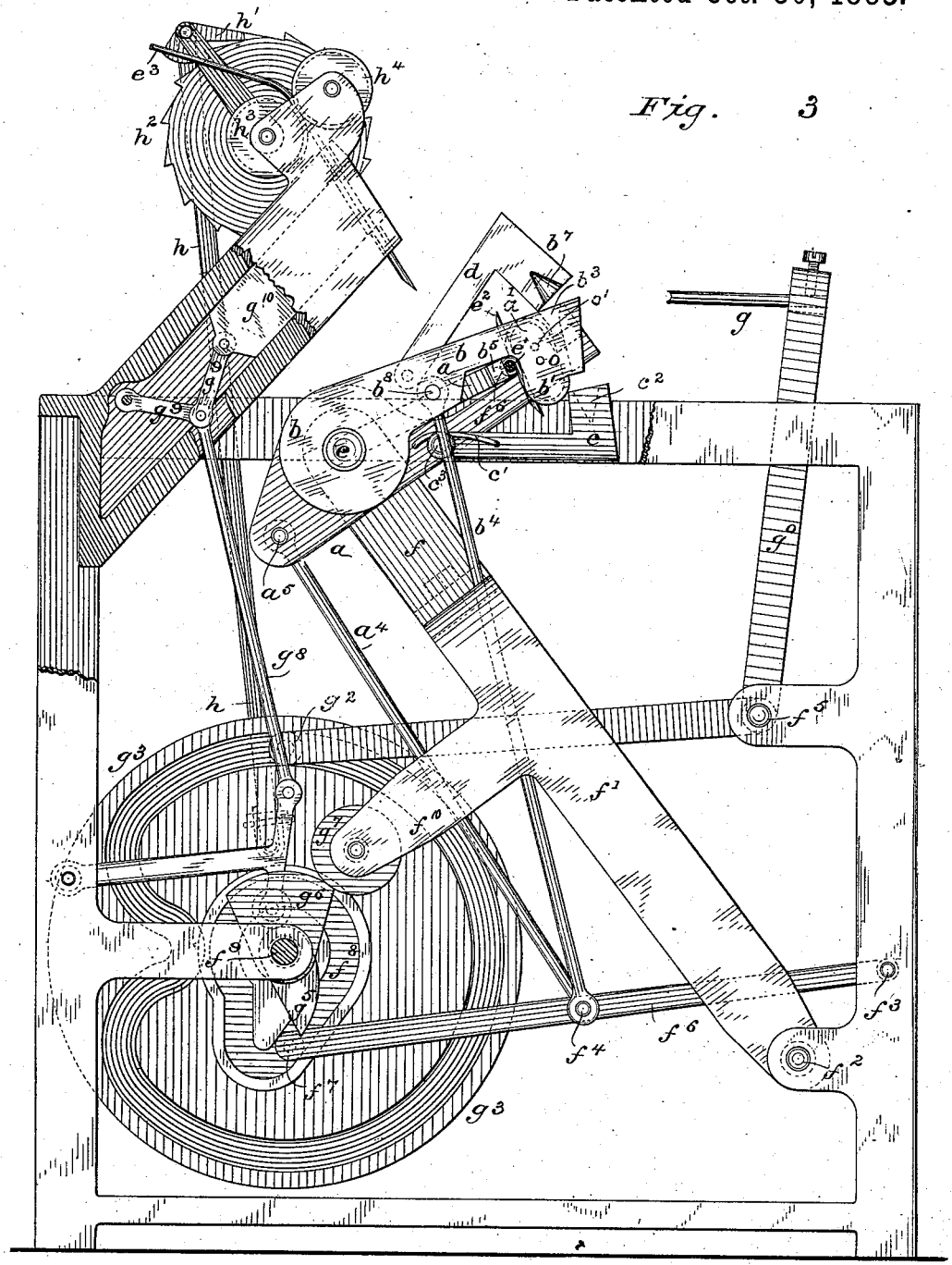
Figure 4:
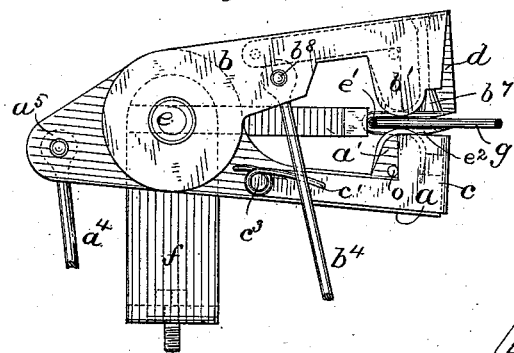
Figure 5:
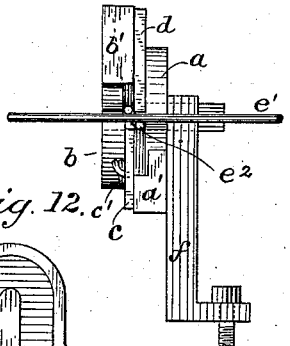
Figure 12:
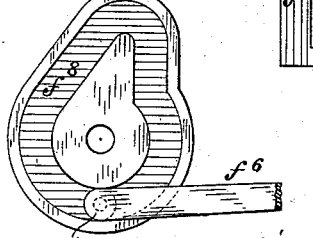
Figures 6, 7:
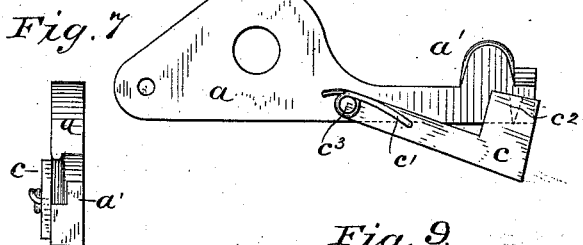
Figure 13:
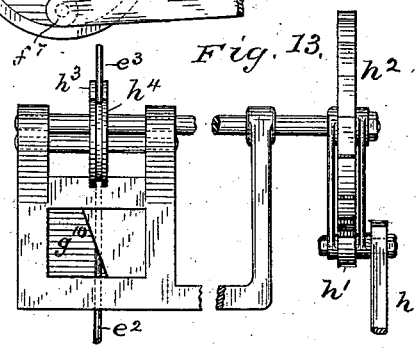
Figure 9:
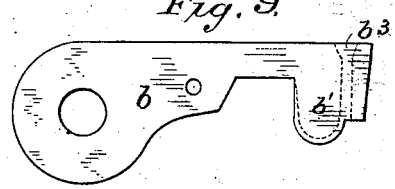
Figure 11:
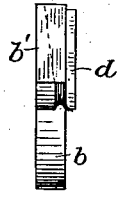
Figure 10:
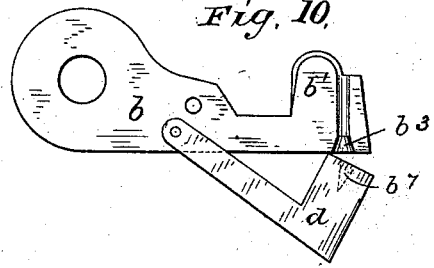
Figures 8, 14:
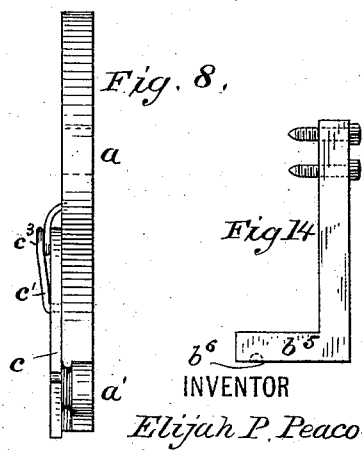

Figure 1 represents a view of my improved machine in front elevation with a portion of the frame broken away. Fig. 2 is a view in side elevation, showing the first position of the bending-jaws. Fig. 3 is a similar view, showing the position of the parts while bending the barb around the fence-wire. Fig. 4 is a detached view, in side elevation, of the bending-jaws, showing the manner of holding the wire $e^2$ in position, and also the second position the jaws assume while bending the barb-wire. Fig. 5 is a view in end elevation of the parts shown in Fig. 4. Fig. 6 is a detached view, in side elevation, of the lower bending-jaw. Fig. 7 is an end view, and Fig. 8 a plan view, of the same. Fig. 9 is a view in side elevation of the upper jaw. Fig. 10 is a similar view of the opposite side of the said jaw. Fig. 11 is a view in end elevation of the upper jaw. Fig. 12 is a view in elevation of the cam which operates the bending-jaws. Fig. 13 is an end view of the barb-cutter and portion of the mechanism employed for feeding the wire to the cutter, and Fig. 14 is a plan view of the stop $b^5$.

Like letters of reference indicate like parts.

The object of my invention is to construct a machine for attaching barbs to fence-wire by means of a pair of jaws, constructed and operated substantially as specified.

In the drawings, $a$ represents the lower, and $b$ the upper, jaws, pivoted in this case at $e$ upon the support $f$, so as to form a pair of pliers. Said jaws are provided, respectively, with rounded projections $a'$ and $b'$ at their front ends, having grooves $a^2 b^2$ formed on the inner or contact side of the jaws; or said grooves may be cut into a wheel placed with the groove, as here shown.

$c$ and $d$ are guards or blades pivoted to the jaws at $d'$ and $c^3$, and which cover the inner sides of the front half of the parts $a' b'$, and of which $c$ is held up to its place by a spring, $c'$, while the upper blade, $d$, falls into its place by gravity. From the inner side of the guards $c$ and $d$ are cut notches $c^2 b^7$, which come directly opposite the grooves or notches $a^2 b^2$, through which and the channel $b^3$ the barb $e^2$ falls, and in which it rests, with one point in the V-shaped notch $a^3$ extending back longitudinally from the front of the jaw $a$, as seen in Fig. 2. The jaws $a$ and $b$ project forward from about the center of the parts $a' b'$, so as to admit of the said channel $b^3$ and V-shaped notch $a^3$ being cut. Back of $a' b'$ is a support, $b^5$, attached to the support $f$, and which is provided with a notch, $b^6$, (shown in Figs. 2 and 14,) in which the back of the staple-formed barb rests, and which acts as a support to the staple so formed while its ends are wound around the fence-wire.

A strip, $g$, notched in its front end, to fit on the wire $e'$, is attached to the frame $g^0$ in line to strike said wire, and so as to be always in front of the barb-wire $e^2$. In Fig. 4 the said blade is at the end of its forward stroke, its rear part being shown broken away.

The preceding-described parts form the essential features of my invention, which may, with slight modification, be adapted to be worked by hand. As here represented, the jaws are mounted on a fulcrum, $e$, on the support $f$, carried on the vibrating support $f'$, which latter is pivoted at $f^2$. Said support $f'$ has a fixed arm, $f^{10}$, carrying a roller, $g^7$, which latter is worked by a cam, $g^6$, on the shaft $f^9$. The frame $g^0$ is fulcrumed at $f^5$, and has a rigid arm extending to the cam-wheel $g^3$, provided with a groove, in which plays the roller $g^2$.

A lever, $f^6$, is fulcrumed at $f^3$, and carries at its outer end a roller, $f^7$, playing in the groove of a cam, $f^8$, attached to shaft $f^9$, and the pivot $f^4$ of the said lever $f^6$ and studs $a^5 b^8$ of the jaws $a$ and $b$ are connected by rods $a^4 b^4$. There is also a cam, $g^5$, attached to the shaft $f^9$, which works the rod $g^8$ and toggle $g^9$, to operate the jaw or shear $g^{10}$, which passes the stationary jaw $g^{11}$ and cuts the wire $e^3$ into barbs $e^2$ as it is fed to the shears from the rollers $h^3$ $h^4$. The roller $h^3$ is attached to the shaft which carries the ratchet-wheel $h^2$, and which is operated by the pawl $h'$ through the rod $h$, attached to the cam-wheel $g^3$.

The operation of the mechanism shown is as follows, viz: Motion being given to the shaft $f^9$, the rod $h$, ratchet $h^2$, and feed-wheels $h^3$ $h^4$ will cause the wire $e^3$ to be fed to the shear of proper length, which will then, by the action of the parts $g^5$, $g^8$, and $g^9$, cut it at the proper time to cause the barb-wire $e^2$ to drop into the channel $b^3$ at the point where the jaws have come to the end of their backward stroke. (Shown in Fig. 2.) Said wire $e^2$ then drops through the channel $b^3$ until its lower point rests in the notch $a^3$. Then, by the motion of the cam $g^6$, the jaws will be thrown forward against the fence-wire $e'$ and the blade $g$ by the cam $g^3$. At the instant that the yet straight barb-wire $e^2$ touches the rear of the fence-wire $e'$ the point of the blade $g$ comes to rest, while the jaws continue in their motion until they have bent the barb-wire $e^2$ into a staple, as shown in Fig. 4, while its center, now formed into the rounded end of a staple, rests in the notch $b^6$, formed in the support $b^5$. At this instant the blade $g$ recedes quickly, and the forward motion of the jaws stops, while the cam $f^8$ depresses the lever $f^6$, and thus closes the parts $a'$ $b'$ past each other, thereby passing the legs of the staple $e^2$ past each other, and which is thereby wound upon the wire $e'$, as shown in Fig. 3, after which the cam $f^8$ again opens the jaws quickly, and which now move backward under the shears $g^{10}$, to receive a fresh barb. The blades $c$ and $d$ are pushed back by the opposite parts, $b'$ $a'$, when closing, and as the jaws open the said blades move to their respective places, in which they are then held by the pins or stops $o$ $o'$, and then serve as guards, to hold the barb-wire $e^2$ in the channels $b^3$ $b^7$ $c^2$ and notch $a^3$ until it is formed into a staple, as shown in Fig. 4. This construction gives the barb $e^2$ an inclined position, so as to be held by both jaws at the same time, ready to be formed into a staple, the legs of which, while forming, slide in the grooves $a^2$ $b^2$, and are held therein, so that they may pass each other when they are wound around the fence-wire. The staple is also further secured in said diagonal position by means of the notch $b^6$, so cut in the support $b^5$ as to receive and hold the staple in such position.

The fence-wire $e'$, it will be observed, is at rest laterally, while the jaws and blade $g$ are moving to and from it; but the jaws may be left at rest and the wire $e'$ pushed into them by the blade $g$, or otherwise, and so arranged as to move or spring out of the jaws as soon as released from them, after which it may move longitudinally, to receive more barbs.

What I claim as new is—

1. Jaws provided with projections $a'$ $b'$, having channels to receive and hold barbs $e^2$, in combination with the blade $g$ and stop $b^5$.

2. Jaws provided with rounded projections $a'$ $b'$, having grooves $a^2$ $b^2$, notch and channels, in combination with guards $c$ $d$ and blade $g$, substantially as specified.

3. Jaws provided with rounded inwardly-pointing projections $a'$ $b'$, having grooves $a^2$ $b^2$, channel $b^3$, and notch $a^3$, in combination with guards $c$ $d$, having notches $c^2$ $b^7$, stop $b^5$, and blade $g$.

4. The cams $f^8$ $g^3$ $g^5$ $g^6$, levers $f'$ $f^6$ $g^0$ $g^9$, rods $a^4$ $b^4$, and jaws adapted to receive, hold, and, in combination with mechanism $g$, wind a barb upon a fence-wire.

5. Jaws provided with rounded projections $a'$ $b'$, having grooves $a^2$ $b^2$ and notch and channel, in combination with mechanism $g$.

6. Jaws provided with channels, grooves, and notch, adapted to receive, hold, and, in combination with mechanism $g$, wind a barb upon a fence-wire.

7. Jaws adapted to receive, hold, and, in combination with mechanism $g$, wind a barb upon a fence-wire.

ELIJAH P. PEACOCK.

Witnesses:
WM. ZIMMERMAN,
W. H. JAYNE.